US012748439B2

(12) United States Patent
Peng et al.

(10) Patent No.: US 12,748,439 B2
(45) Date of Patent: Sep. 29, 2026

(54) DOFFING SCHEDULING METHOD FOR YARN SPINDLE PRODUCT, ELECTRONIC DEVICE, AND STORAGE MEDIUM

(71) Applicant: ZHEJIANG HENGYI PETROCHEMICAL CO., LTD., Zhejiang (CN)

(72) Inventors: Xiantao Peng, Zhejiang (CN); Peng Wang, Zhejiang (CN); Dake Li, Zhejiang (CN); Dong Jiang, Zhejiang (CN); Weike Li, Zhejiang (CN); Jian Wang, Zhejiang (CN); Feng Xu, Zhejiang (CN)

(73) Assignee: ZHEJIANG HENGYI PETROCHEMICAL CO., LTD., Zhejiang (CN)

( * ) Notice: Subject to any disclaimer, the term of this patent is extended or adjusted under 35 U.S.C. 154(b) by 110 days.

(21) Appl. No.: 18/800,330

(22) Filed: Aug. 12, 2024

(65) Prior Publication Data

US 2025/0085717 A1 Mar. 13, 2025

(30) Foreign Application Priority Data

Sep. 8, 2023 (CN) ......................... 202311158904.2

(51) Int. Cl.
*G05D 1/648* (2024.01)
*G05D 1/644* (2024.01)
(Continued)

(52) U.S. Cl.
CPC ............. *G05D 1/648* (2024.01); *G05D 1/644* (2024.01); *G05D 2107/70* (2024.01); *G05D 2109/14* (2024.01)

(58) Field of Classification Search
CPC .... G05D 1/648; G05D 1/644; G05D 2107/70; G05D 2109/14
See application file for complete search history.

(56) References Cited

U.S. PATENT DOCUMENTS 5,169,271 A * 12/1992 Yamashita ........... B65H 67/065 414/908
12,124,240 B1 * 10/2024 Ghare ................ G05B 19/4155
(Continued)

FOREIGN PATENT DOCUMENTS

CN 107651392 A 2/2018
CN 110424075 A 11/2019
(Continued)

OTHER PUBLICATIONS

CN111924664B machine translation (Year: 2022).*
(Continued)

*Primary Examiner* — Navid Z. Mehdizadeh
*Assistant Examiner* — Oliver Tan
(74) *Attorney, Agent, or Firm* — Faegre Drinker Biddle Reath LLP

(57) ABSTRACT

Provided is a doffing scheduling method and apparatus for yarn spindle product, and storage medium, applied in an automatic doffing system, relating to the field of computer technology, and particularly to the field of automation control. The automatic doffing system is connected to an automated guided vehicle, (AGV) and an overhead rail doffing vehicle, the AGV and the overhead rail doffing vehicle being deployed in different vertical spaces within a target workshop. The method includes: determining a target doffing vehicle corresponding to a first winding machine in the target workshop from the AGV and the overhead rail doffing vehicle based on time-related information of doffing the yarn spindle product in all or part of winding machines in the target workshop; scheduling the target doffing vehicle to complete a doffing task of the yarn spindle product in the first winding machine.

5 Claims, 3 Drawing Sheets

(51) Int. Cl.
*G05D 107/70* (2024.01)
*G05D 109/10* (2024.01)

(56) References Cited

U.S. PATENT DOCUMENTS

| | | | | |
|---|---|---|---|---|
| 2014/0365258 | A1* | 12/2014 | Vestal | G06Q 10/063114 901/1 |
| 2021/0216957 | A1 | 7/2021 | Parmar | |
| 2022/0074084 | A1 | 3/2022 | Zhang et al. | |

FOREIGN PATENT DOCUMENTS

| | | | | | |
|---|---|---|---|---|---|
| CN | 111061272 | A | | 4/2020 | |
| CN | 111176287 | A | | 5/2020 | |
| CN | 210765678 | U | | 6/2020 | |
| CN | 111792456 | A | | 10/2020 | |
| CN | 111924663 | A | | 11/2020 | |
| CN | 111924659 | B | * | 4/2022 | G05B 19/41885 |
| CN | 111924664 | B | * | 4/2022 | B65H 67/0411 |
| CN | 216956750 | U | | 7/2022 | |
| CN | 115237073 | A | | 10/2022 | |
| EP | 3181501 | B1 | * | 4/2019 | D01H 13/005 |
| JP | 0859087 | A | | 3/1996 | |
| JP | 2020185663 | A | | 11/2020 | |
| JP | 2022137041 | A | | 9/2022 | |
| WO | 2018096427 | A2 | | 5/2018 | |

OTHER PUBLICATIONS

CN111924659B translation (Year: 2022).*
EP3181501B1 translation (Year: 2019).*
Japanese Patent Office; Notice of Reasons for Rejection and translation; Japanese Application No. 2024-074723; 8 pages; dated Aug. 5, 2025.
The State Intellectual Property Office of People's Republic of China; CN First Office Action; CN Application No. 202311158904.2; 17 pages; dated Oct. 23, 2023.
The State Intellectual Property Office of People's Republic of China; Notification to Grant Patent Right for Invention; CN Application No. 202311158904.2; 6 pages; dated Jan. 9, 2025.
European Patent Office; Extended European Search Report; EP Application No. 24195141.7; 6 pages; dated Dec. 9, 2024.
Zheng, Xiaohu et al.; Spinning workshop collaborative scheduling method based on simulated annealing genetic algorithm; English Abstract; Journal of Textile Research; 6 pages; Jun. 15, 2020.

* cited by examiner

DOFFING SCHEDULING METHOD FOR YARN SPINDLE PRODUCT, ELECTRONIC DEVICE, AND STORAGE MEDIUM

CROSS-REFERENCE TO RELATED APPLICATIONS

The present application claims priority to Chinese Patent Application No. CN202311158904.2, filed with the China National Intellectual Property Administration on Sep. 8, 2023, the disclosure of which is hereby incorporated herein by reference in its entirety.

TECHNICAL FIELD

The present disclosure relates to the field of computer technology, and in particular, to the field of automation control.

BACKGROUND

In the process of doffing yarn spindle products in a winding machine, a doffing task can be completed by an Automated Guided Vehicle (AGV). However, due to the limitation of the AGV's operating speed and path, the AGV may not reach the designated position in time to complete the doffing task. This results in lower doffing efficiency of the yarn spindle products in the winding machine. Additionally, if a fully-wound yarn spindle product in the winding machine continues to wind, it may lead to tube bursting, rendering the yarn spindle products unusable and increasing their production cost.

SUMMARY

The present disclosure provides a doffing scheduling method and apparatus for yarn spindle product, an electronic device and a storage medium to address or mitigate one or more technical issues in the prior art.

According to a first aspect, the present disclosure provides a doffing scheduling method for a yarn spindle product, applied in an automatic doffing system which is in connection with an AGV and an overhead rail doffing vehicle, the AGV and the overhead rail doffing vehicle being deployed in different vertical spaces within a target workshop, and including:

- determining, based on time-related information of doffing the yarn spindle product in all or part of winding machines in the target workshop, a target doffing vehicle corresponding to a first winding machine in the target workshop from the AGV and the overhead rail doffing vehicle; and
- scheduling the target doffing vehicle to complete a doffing task of the yarn spindle product in the first winding machine.

According to a second aspect, the present disclosure provides a doffing scheduling apparatus for a yarn spindle product, applied in an automatic doffing system which is in connection with an automated guided vehicle AGV and an overhead rail doffing vehicle, the AGV and the overhead rail doffing vehicle being deployed in different vertical spaces within a target workshop, and including:

- a first determination module, configured to determine, based on time-related information of doffing the yarn spindle product in all or part of winding machines in the target workshop, a target doffing vehicle corresponding to a first winding machine in the target workshop from the AGV and the overhead rail doffing vehicle; and
- a scheduling module, configured to schedule the target doffing vehicle to complete a doffing task of the yarn spindle product in the first winding machine.

According to a third aspect, provided is an electronic device, including: at least one processor; and a memory connected in communication with the at least one processor. The memory stores an instruction executable by the at least one processor, and the instruction, when executed by the at least one processor, enables the at least one processor to execute the method of any embodiment of the present disclosure.

According to a fourth aspect, provided is a non-transitory computer-readable storage medium storing a computer instruction thereon, and the computer instruction is used to cause a computer to execute the method of any embodiment of the present disclosure.

The technical solution provided by the disclosure includes at least the following beneficial effects that: based on the time-related information doffing the yarn spindle product in the winding machine, an AGV and/or an overhead rail doffing vehicle is selected to execute the winding task, such that the automatic doffing is completed by coordinating the AGV and the overhead rail doffing vehicle, thereby improving the doffing efficiency of the yarn spindle product in the winding machine, preventing the occurrence of tube bursting when a yarn spindle product continue to wind after being fully-wound, and reducing the production cost of the yarn spindle products.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

To facilitate understanding of the doffing scheduling method for yarn spindle products according to the embodiment of the present disclosure, the related technologies of the embodiments will be explained below. The related technologies as optional solutions can be combined with the technical solutions of the embodiments of the present disclosure, and all such combinations fall within the protection scope of the embodiments of the present disclosure.

Method 1: Completing the doffing task through manual labor results in low doffing efficiency and high labor costs.

Method 2: Completing the doffing task with an AGV is limited by their operating speed and path, which may result in delays in the reaching designated position to complete the task. This leads to lower doffing efficiency of yarn spindle products in the winding machine. Moreover, if a fully-wound yarn spindle product in the winding machine continues to wind, it may lead to tube bursting, rendering the yarn spindle products unusable and increasing their production costs.

In summary, both of the above methods for completing the doffing task, whether relying on manual labor or the AGV, result in lower doffing efficiency and higher production costs for the yarn spindle products.

Figure 1:
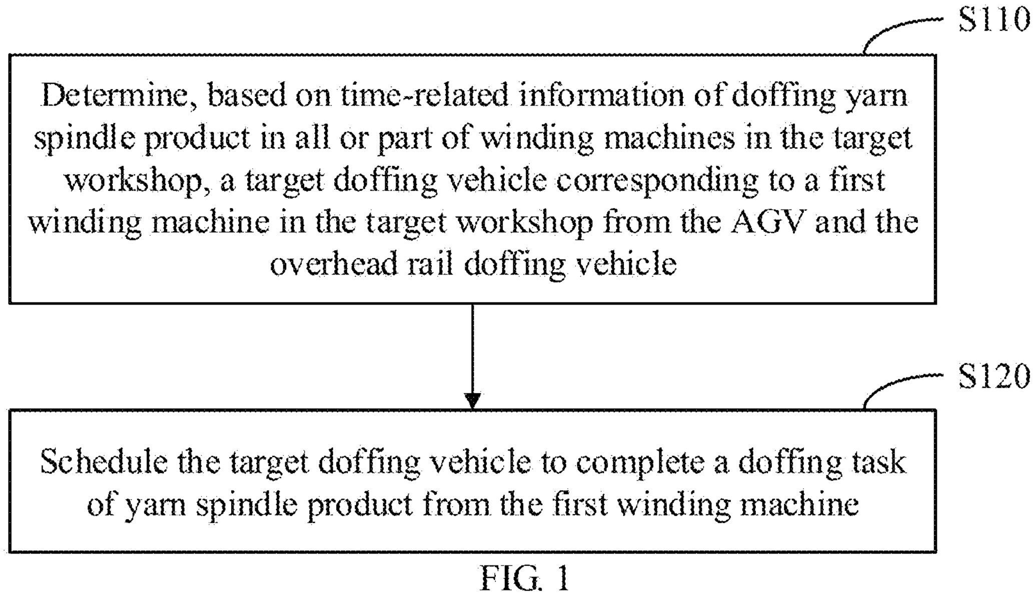
FIG. 1 is a flowchart of a doffing scheduling method for yarn spindle product according to an embodiment of the present disclosure.

FIG. 1 shows a doffing scheduling method for yarn spindle product according to an embodiment of this disclosure. This method can be applied in an automatic doffing system which is in connection with an Automated Guided Vehicle (AGV) and an overhead rail doffing vehicle. The AGV and the overhead rail doffing vehicle are deployed in different vertical spaces within a target workshop. As shown in FIG. 1, the method may include:

- Step S110: determining, based on time-related information of doffing the yarn spindle product in all or part of winding machines in the target workshop, a target doffing vehicle corresponding to a first winding machine in the target workshop from the AGV and the overhead rail doffing vehicle; and
- Step S120: scheduling the target doffing vehicle to complete a doffing task of the yarn spindle product in the first winding machine.

In this embodiment of the disclosure, the automatic doffing system can obtain data transmitted from the winding machine, the AGV, and the overhead rail doffing vehicle. For example, the system can receive the time-related information regarding the yarn spindle product doffing, the quantity of yarn spindle products in the winding machine, and positional information of the AGV and overhead rail doffing vehicle. The automatic doffing system can also send instruction information to the winding machine, the AGV and the overhead rail doffing vehicle. For instance, the system can send a doffing instruction to the AGV and the overhead rail doffing vehicle, to schedule the AGV and the overhead rail doffing vehicle to travel to the winding machine to complete the doffing task.

Exemplarily, the AGV can travel freely on the ground without relying on a rail. Travelling mode of the overhead rail doffing vehicle involves providing a rail at a position of a certain height in the target workshop, allowing the vehicle to travel along the rail. The AGV and the overhead rail doffing vehicle travel independently. When the AGV and the overhead rail doffing vehicle reach a same position in the target workshop, the AGV and the overhead rail doffing vehicle do not collide or interfere with each other because they are deployed in different vertical spaces within the workshop.

Exemplarily, the target workshop may include multiple winding machines of the same type or different types. Yarn spindle products in different winding machines may correspond to different winding times, different process flows or different product types.

Exemplarily, each winding machine includes at least one type of yarn spindle product, where each spindle can include a paper tube and fibers wound around an outside of the paper tube. It can be understood that in this embodiment, the time-related information of doffing the yarn spindle product refers to a duration required for the fibers in the yarn spindle product to be completely wound in the winding machine and/or an anticipated time for doffing. The fibers can be chemical fiber filaments, such as POY (Pre-Oriented Yarn), FDY (Full Draw Yarn) and HOY (High Oriented Yarn).

Exemplarily, the target doffing vehicle can also be referred to as a trolley. The target doffing vehicle can be one of the AGV and the overhead rail doffing vehicle, or it can include both the AGV and the overhead rail doffing vehicle. For the yarn spindle products in each winding machine, the doffing task can be completed by one or more target doffing vehicles. For the entire workshop, each target doffing vehicle can complete the doffing tasks of the yarn spindle products from multiple winding machines.

In a practical application, the AGV and the overhead rail doffing vehicle can travel to the winding machine, where the winding machine pushes a yarn spindle product that has completed winding onto the AGV and the overhead rail doffing vehicle. After unloading the yarn spindle product that has completed winding from the winding machine, the AGV and the overhead rail doffing vehicle can place an empty paper tube at an empty spindle position of the winding machine to initiate winding of a new yarn spindle product. Subsequently, the AGV and the overhead rail doffing vehicle transport the yarn spindle product on board to a yarn receiving station.

According to the technical solution of this embodiment of the disclosure, the AGV and the overhead rail doffing vehicle can be deployed in different vertical spaces within the target workshop. Based on the time-related information of doffing the yarn spindle product in the winding machine, the AGV or the overhead rail doffing vehicle is selected to execute the doffing task. In this way, the automatic doffing process is completed through the collaboration of the AGV and the overhead rail doffing vehicle, thereby enhancing the doffing efficiency of the yarn spindle products in the winding machine and reducing the production costs of yarn spindle products.

Figure 2:
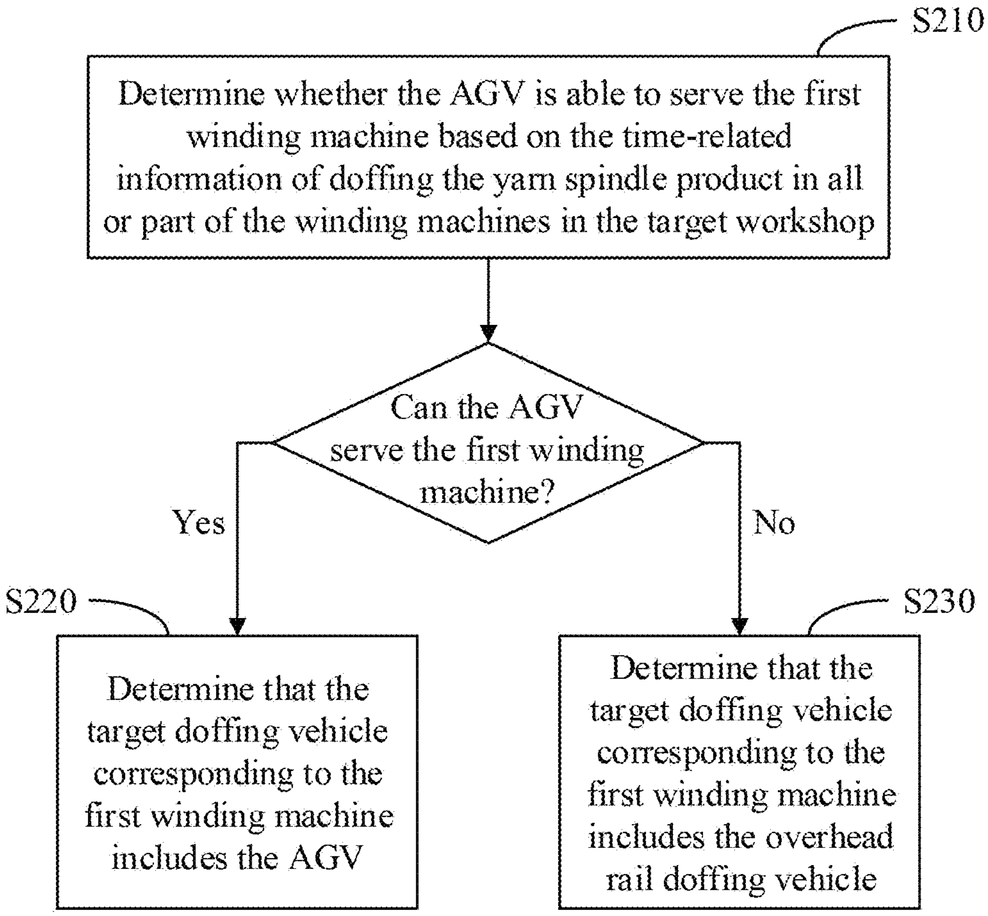
FIG. 2 is a flowchart of a doffing scheduling method for yarn spindle product according to another embodiment of the present disclosure.

In some embodiments, Step S110 of determining the target doffing vehicle corresponding to the first winding machine in the target workshop from the AGV and the overhead rail doffing vehicle based on the time-related information of doffing the yarn spindle product in all or part of the winding machines in the target workshop, as shown in FIG. 2, may include:

Step S210: determining whether the AGV is able to serve the first winding machine based on the time-related information of doffing the yarn spindle product in all or part of the winding machines in the target workshop; and Step S220: determining that the target doffing vehicle corresponding to the first winding machine includes the AGV in the case where the AGV is able to serve the first winding machine.

In this embodiment of the disclosure, due to lower energy consumption and cost of the AGV compared to the overhead rail doffing vehicle, it is preferentially determined whether the AGV can serve the first winding machine. If the AGV is capable of serving the first winding machine, only the AGV needs to travel to the winding machine and transport the yarn spindle products that have completed wind from the winding machine to the receiving station.

Exemplarily, the automatic doffing system, based on the time-related information of dropping the yarn spindle product in the winding machine, can take into account a current number of schedulable AGVs to predict whether the AGV can arrive at the corresponding position when the yarn spindle product in the first winding machine has completed winding, in order to complete the doffing task.

According to the technical solution of this disclosure, a judgment is made on whether the AGV can serve the first winding machine. In the event that the AGV can serve the first winding machine, the AGV could complete the doffing task of the yarn spindle product in the first winding machine, thereby further reducing the production costs of the yarn spindle products without affecting the doffing efficiency of the yarn spindle products.

In some embodiments, Step S110 of determining the target doffing vehicle corresponding to the first winding machine in the target workshop from the AGV and the overhead rail doffing vehicle based on the time-related information of doffing the yarn spindle product in all or part of the winding machines in the target workshop, as shown in FIG. 2, may further include:

Step S230: determining that the target doffing vehicle corresponding to the first winding machine includes the overhead rail doffing vehicle in the case where the AGV is not able to serve the first winding machine.

In this embodiment of the disclosure, the overhead rail doffing vehicle has a higher doffing efficiency, enabling it to complete the doffing task of the yarn spindle product in the first winding machine. According to the technical solution of the disclosure, the judgment is made on whether the AGV can serve the first winding machine. In the event that the AGV cannot serve the first winding machine, the overhead rail doffing vehicle could complete the doffing task of the yarn spindle product in the first winding machine. This eliminates the need for extended waiting time for the AGV and ensures timely completion of doffing tasks of yarn spindle products in the first winding machine, thereby further improving the doffing efficiency of the yarn spindle products in the winding machine.

In some embodiments, in the event that the AGV cannot serve the first winding machine, the quantity N of yarn spindle products doffed by the overhead rail doffing vehicle and the quantity M of yarn spindle products doffed by the AGV can be predicted based on time-related information of doffing yarn spindle products and/or quantity information of yarn spindle products in the winding machine, determining that the target doffing vehicle includes both the AGV and the overhead rail doffing vehicle which collaborate to complete the doffing task for the first winding machine. By completing the doffing task for M yarn spindle products using the AGV and completing the doffing task for N yarn spindle products using the overhead rail doffing vehicle, AGV's service capacity can be fully utilized. This ensures that all the doffing tasks for the yarn spindle products in the first winding machine are completed, while further reducing the production costs of yarn spindle products.

For example, when there are two yarn spindle products in the first winding machine and one slot is available for an AGV, the AGV can serve one yarn spindle product in the first winding machine, while the overhead rail doffing vehicle can serve the other yarn spindle product in the first winding machine.

In some embodiments, Step S210 of determining whether the AGV is able to serve the first winding machine based on the time-related information of doffing the yarn spindle product in all or part of the winding machines in the target workshop, includes:

determining the number of winding machines that the AGV is able to serve based on a winding duration of a yarn spindle product to be processed in each winding machine in the target workshop;

determining a set of winding machines that are served by the AGV based on the number of winding machines that the AGV is able to serve and a distance between each winding machine and a yarn receiving station in the target workshop; and determining that the AGV is able to serve the first winding machine in the case where the set of winding machines served by the AGV includes the first winding machine.

Exemplarily, the winding duration of the yarn spindle product to be processed can be understood as a time duration required to complete a full winding of the yarn spindle product. If the winding duration of the yarn spindle product to be processed in each winding machine is short, the number of winding machines that the AGV can serve is fewer. Conversely, if the winding duration of the yarn spindle product to be processed in each winding machine is long, the number of winding machines that the AGV can serve is greater.

Exemplarily, in some scenarios, the AGV has a movement speed slower than the overhead rail doffing vehicle. Based on this, the winding machines closer to the yarn receiving station can be determined as the set of winding machines that are served by the AGV. Specifically, assuming that the number of winding machines that the AGV can serve is L, then the set of winding machines that are served by the AGV includes L winding machines that are closest to the yarn receiving station.

Figure 3:
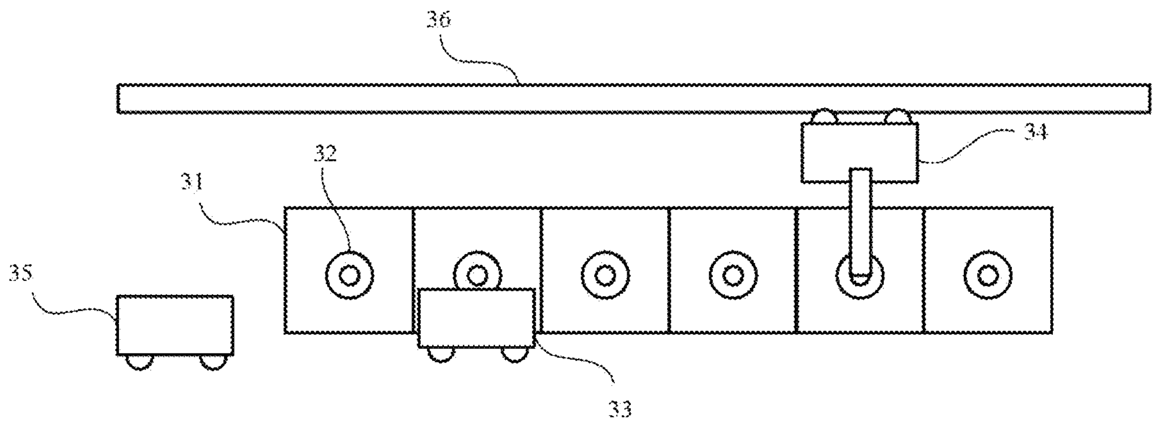
FIG. 3 is a schematic diagram of an application scenario of the doffing scheduling method for yarn spindle product according to an embodiment of the present disclosure.

For example, as shown in FIG. 3, when the winding duration of the yarn spindle products 32 in various winding machines 31 in the target workshop is relatively long (such as when the yarn spindle products being wound on the current day are fine denier yarn), the number of doffing times of the yarn spindle products 32 is fewer within a day, requiring not higher transportation capacity. In this scenario, the AGV 33 can service a larger number of winding machines, while the number of overhead rail doffing vehicles 34 can be reduced. For example, assuming that there are 10 winding machines in a workshop with 8 of them being assigned to be served by the AGV, the AGV carries out the doffing task when the 8 winding machines have fully-wound yarn spindle products, and meanwhile, the overhead rail doffing vehicle carries out the doffing task when the remaining 2 winding machines have fully-wound yarn spindle products. Due to the lower energy consumption and cost of the AGV 33 compared to overhead rail doffing vehicle 34, the transportation cost of the yarn spindle products 32 can be reduced. When the winding duration of the yarn spindle products 32 in various winding machine 31 is short, the number of doffing times of the yarn spindle products 32 is greater within a day, requiring higher transportation capacity. In this scenario, the AGV 33 can only serve a smaller number of winding machines 31, while the number of the winding machines 31 served by the overhead rail doffing vehicles 34 can be increased accordingly, to ensure that all the doffing tasks of the yarn spindle products 32 in the winding machines 31 are completed, thereby improving the doffing efficiency. The AGV 33 can transport the doffed yarn spindle products 32 to the yarn receiving station 35, while the overhead rail doffing vehicle 34 can also transport the doffed yarn spindle products to the yarn receiving station 35 via an overhead rail 36.

According to the technical solution of this disclosure, based on the winding duration of the yarn spindle products in each winding machine, the number of winding machines served by the AGV can be determined. This allows for the pre-assignment of doffing tasks for each winding machine to respective doffing vehicles, optimizing the use of AGV service capability based on production capacity. Simultaneously, the overhead rail doffing vehicle can be used for supplement, balancing cost and efficiency considerations. Furthermore, by leveraging a speed difference between the AGV and the overhead rail doffing vehicle, the AGV can be assigned to serve a nearer winding machine while the overhead rail doffing vehicle to serve a farther winding machine, thereby further improving doffing efficiency.

In an example, if the set of winding machines that are served by the AGV does not include the first winding machine, it is determined that the AGV cannot serve the first winding machine. In this scenario, the overhead rail doffing vehicle can serve the first winding machine and complete the doffing task of the yarn spindle product in the first winding machine. This enables to reduce the waiting time for the AGV, ensuring that all the doffing tasks of the yarn spindle products in the first winding machine are completed, thereby improving the doffing efficiency.

In some embodiments, Step S210 of determining whether the AGV is able to serve the first winding machine based on the time-related information of the doffing yarn spindle product in all or part of the winding machines in the target workshop, includes:

- when the AGV is carrying out a doffing task of a yarn spindle product in a second winding machine in the target workshop, if a time distance between current time and doffing time of the first winding machine in the target workshop is less than a first preset duration, then based on at least one of the number of yarn spindle products to be doffed in the second winding machine, estimated doffing time of the yarn spindle products to be doffed in the second winding machine, the number of the yarn spindle products to be doffed in the first winding machine, estimated doffing time of the yarn spindle products to be doffed in the first winding machine, available positions for the AGV, or a distance between the AGV and the first winding machine, determining whether the AGV is able to serve the first winding machine.

Exemplarily, the first preset duration refers to a preset duration threshold. The duration threshold can be configured by a user. For example, the first preset duration can be entered through input units in the automatic doffing system, such as a mouse or keyboard, or can be obtained from a user device connected to the automatic doffing system. In practical applications, the automatic doffing system or the user device can provide a user interface where the user can input the first preset duration.

Exemplarily, if a total number of yarn spindle products to be doffed in the second winding machine and yarn spindle products to be doffed in the first winding machine is less than or equal to the number of positions available for the AGV, and if the AGV can move from the position of the second winding machine to that of the first winding machine within the first preset duration, then the AGV can complete the doffing task of the yarn spindle products in the first winding machine. If the total number of the yarn spindle products to be doffed in the second winding machine and the yarn spindle products to be doffed in the first winding machine is less than or equal to the number of positions available for the AGV but the AGV cannot move from the position of the second winding machine to the position of the first winding machine within the first preset duration due to limit of its movement speed, then the automatic doffing system could schedule the overhead rail doffing vehicle to complete the doffing task of the yarn spindle products in the first winding machine. If the total number of the yarn spindle products to be doffed in the second winding machine and the yarn spindle products to be doffed in the first winding machine exceeds the number of positions available for the AGV, the automatic doffing system could schedule the overhead rail doffing vehicle to complete the doffing task for the yarn spindle products in the first winding machine.

According to the technical solution of this disclosure, when the time distance between the current time and the doffing time of the first winding machine is less than the first preset duration, AGV's ability to serve the first winding machine can be determined based on the following factors: the number of yarn spindle products to be doffed in the second winding machine, the number of yarn spindle products to be doffed in the first winding machine, the available positions for the AGV, and the distance between the AGV and the first winding machine. This ensures that all the doffing tasks for yarn spindle products in the first winding machine are completed promptly and efficiently.

In some embodiments, Step S210 of determining whether the AGV is able to serve the first winding machine based on the time-related information of doffing the yarn spindle product in all or part of the winding machines in the target workshop, includes:

- determining, based on the winding duration of the yarn spindle product to be processed in each winding machine in the target workshop, estimated time for each doffing in each winding machine within a target period;
- determining, based on the estimated time for each doffing in each winding machine within the target period, a doffing time list within the target period, wherein the doffing time list includes multiple doffing times and the winding machine corresponding to each of the multiple doffing times;
- determining, based on the doffing time list, K winding machines with a doffing time interval less than a second preset duration; and
- determining, based on a distance between the first winding machine in the K winding machines and the yarn receiving station, whether the AGV is able to serve the first winding machine.

Exemplarily, time distances between the estimated time for each doffing in each winding machine and the current time can be sorted to determine the doffing time list within the target period. For instance, the list can be arranged in an ascending order of the time distances between the estimated times and the current time.

Exemplarily, the second preset duration is a preset duration threshold. This duration threshold can be configured by the user. For instance, the first preset duration can be entered through input units in the aforementioned automatic doffing system, such as a mouse or keyboard, or can be obtained a user device connected to the automatic doffing system. In practical applications, the automatic doffing system or the user device can provide a user interface where the user can input the second preset duration.

Exemplarily, in the case where K winding machines includes the first winding machine, and based on the distance between the first winding machine and the yarn receiving station, it is determined that the AGV cannot serve the first winding machine, due to the AGV's slower movement speed compared to the overhead rail doffing vehicle, the AGV will complete a doffing task of a yarn spindle product in a winding machine closer to the yarn receiving station in the first winding machines while the overhead rail doffing vehicle will complete a doffing task of a yarn spindle product in a winding machine farther from the yarn receiving station in the first winding machines.

For example, Table 1 represents the doffing time list of yarn spindle products in the winding machines.

TABLE 1

| Winding machine | Winding duration | Remaining time | Estimated time |
|---|---|---|---|
| Number 1 | 02:20:30 | 02:03:30 | 12:36:02 |
| Number 2 | 00:08:35 | 04:15:25 | 14:57:58 |
| Number 3 | 00:03:40 | 04:20:20 | 15:02:53 |
| Number 4 | 00:22:18 | 04:01:42 | 14:44:16 |
| Number 5 | 01:16:41 | 03:07:19 | 13:49:53 |
| Number 6 | 02:32:28 | 01:51:32 | 12:35:50 |

The time-related information of doffing the yarn spindle product in the winding machine can include winding duration, remaining time, and doffing time. Based on the winding duration and remaining time, the estimated time can be determined. When the second preset duration is 1 minute, the time interval between the estimated time of Winding machine No. 1 and Winding machine No. 6 is 12 seconds, which is less than the second preset duration. In this case, the AGV cannot complete the doffing tasks for both windings, and thus the tasks can be completed by the cooperation of the AGV and the overhead rail doffing vehicle. In practical applications, since the AGV is slower than the overhead rail doffing vehicle, the AGV can complete the doffing task for the winding machine that is closer to the yarn receiving station. Specifically, because Winding machine No. 1 is closer to the yarn receiving station, the AGV will handle the doffing task of the yarn spindle product in Winding machine No. 1, while the overhead rail doffing vehicle will handle the doffing task of the yarn spindle product in Winding machine No. 6.

According to the technical solution of the present disclosure, by the doffing time list including multiple doffing times and the winding machine corresponding to each of the multiple doffing times, it can be further determined whether the AGV is capable of serving the first winding machine.

Exemplarily, for such a winding machining with a longer doffing time interval, the doffing task can be performed by the AGV. That is, for other winding machines in the target workshop other than the K winding machines, it can be determined that the corresponding doffing vehicle is the AGV. For example, for Winding machines Nos. 2-5 in Table 1, since the estimated doffing time intervals are relatively long, the AGV can complete the doffing tasks for all of them.

In some embodiments, Step S120 of scheduling the target doffing vehicle to complete the doffing task of the yarn spindle product in the first winding machines includes:

- determining, in the case where the target doffing vehicle is the AGV, a travel route of the AGV based on a position of the first winding machine; and
- scheduling, based on the travel route of the AGV, the AGV to deliver the yarn spindle product from the first winding machine to the yarn receiving station.

According to the technical solution of the present disclosure, since the AGV can travel on the ground without a rail, the travel route for each AGV can be planned. This can prevent collisions and mutual interference between multiple AGVs, thereby reducing issues of doffing efficiency for yarn spindle products in the winding machines.

In some embodiments, Step S120 of scheduling the target doffing vehicle to complete the doffing task of the yarn spindle product in the first winding machine includes:

- scheduling, in the case where the target doffing vehicle includes the overhead rail doffing vehicle, the overhead rail doffing vehicle to deliver the yarn spindle product from the first winding machine to the yarn receiving station via a rail based on a position of the first winding machine.

According to the technical solution of the present disclosure, the travel route for each overhead rail doffing vehicle can be planned. This can prevent collisions and mutual interference between multiple overhead rail doffing vehicles, thereby reducing issues of doffing efficiency for yarn spindle products in the winding machines.

Figure 4:
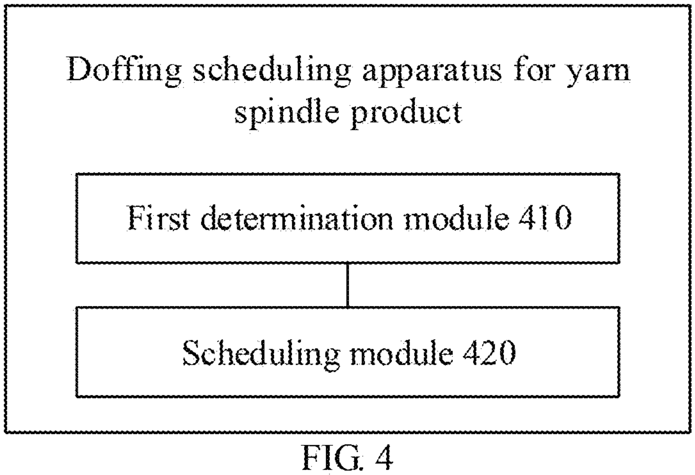
FIG. 4 is a schematic block diagram of a doffing scheduling apparatus for yarn spindle product according to an embodiment of the present disclosure.

According to the embodiment of this disclosure, this disclosure also provides a doffing scheduling apparatus for yarn spindle product. FIG. 4 shows a schematic block diagram of the doffing scheduling apparatus for yarn spindle products according to an embodiment of this disclosure. As shown in FIG. 4, this apparatus is applied in an automatic doffing system which is in connection with an Automated Guided Vehicle (AGV) and an overhead rail doffing vehicle. The AGV and the overhead rail doffing vehicle deployed in different vertical spaces within a target workshop. The apparatus may include:

- a first determination module 410, configured to determine, based on time-related information of doffing the yarn spindle product in all or part of winding machines in the target workshop, a target doffing vehicle corresponding to a first winding machine in the target workshop from the AGV and the overhead rail doffing vehicle, where N is an integer greater than or equal to 1; and
- a scheduling module 420, configured to schedule the target doffing vehicle to complete a doffing task of the yarn spindle product in the first winding machine.

Figure 5:
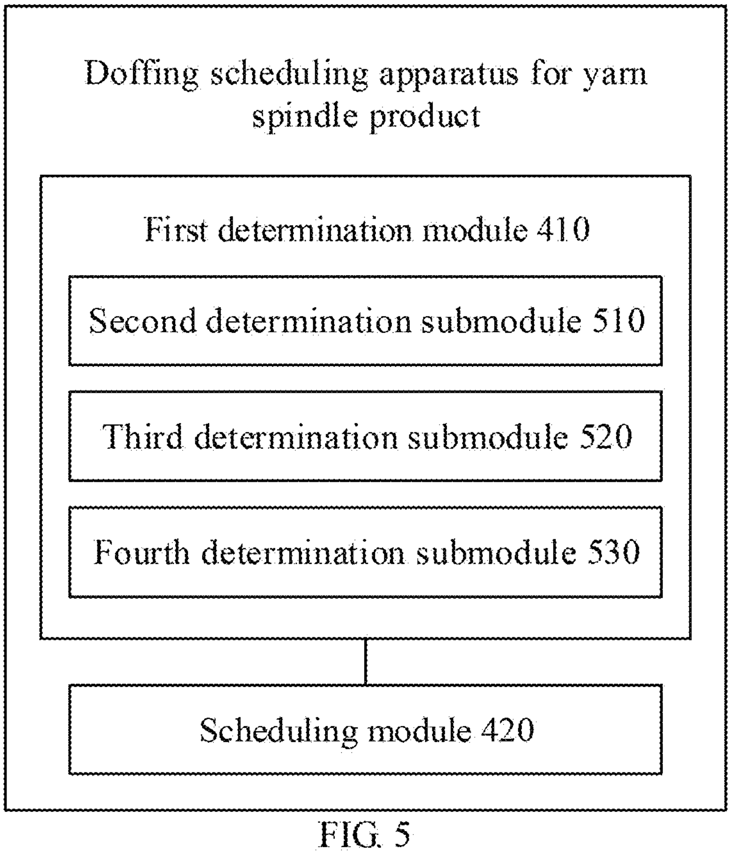
FIG. 5 is a schematic block diagram of a doffing scheduling apparatus for yarn spindle product according to another embodiment of the present disclosure.

In some embodiments, as shown in FIG. 5, the first determination module 410 further includes:

- a second determination submodule 510, configured to determine whether the AGV is able to serve the first winding machine based on time-related information of doffing the yarn spindle product in all or part of the winding machines in the target workshop; and a third determination submodule 520, configured to determine that the target doffing vehicle corresponding to the first winding machine includes the AGV in the case where the AGV is able to serve the first winding machine.

In some embodiments, the first determination module 410 further includes:

a fourth determination submodule 530, configured to determine that the target doffing vehicle corresponding to the first winding machine includes the overhead rail doffing vehicle in the cases where the AGV is not able to serve the first winding machine.

In some embodiments, the AGV has a travel speed slower than the overhead rail doffing vehicle; and the second determination submodule 510 is configured to:

determine the number of winding machines that the AGV is able to serve based on a winding duration of a yarn spindle product to be processed in each winding machine in the target workshop;

determine a set of winding machines that are served by the AGV based on the number of winding machines that the AGV is able to serve and a distance between each winding machine and a yarn receiving station in the target workshop; and determine that the AGV is able to serve the first winding machine in the case where the set of winding machines served by the AGV includes the first winding machine.

In some embodiments, the second determination submodule 510 is configured to:

when the AGV is carrying out a doffing task for a yarn spindle product in a second winding machine in the target workshop, if a time distance between current time and doffing time of the first winding machine in the target workshop is less than a first preset duration, then based on at least one of: the number of yarn spindle products to be doffed in the second winding machine, estimated doffing time of the yarn spindle products to be doffed in the second winding machine, the number of yarn spindle products to be doffed in the first winding machine, the estimated doffing time of the yarn spindle products to be doffed in the first winding machine, available positions for the AGV, or a distance between the AGV and the first winding machine, determine whether the AGV is able to serve the first winding machine.

In some embodiments, the second determination submodule 510 is configured to:

determine, based on a winding duration of the yarn spindle product to be processed in each winding machine in the target workshop, estimated time for each doffing in each winding machine within a target period;

determine, based on the estimated time for each doffing in each winding machine within the target period, a doffing time list within the target period, wherein the doffing time list includes multiple doffing times and the winding machine corresponding to each of the multiple doffing times;

determine, based on the doffing time list, K winding machines with a doffing time interval less than the second preset duration; and in the case where the K winding machines include the first winding machine, determine, based on a distance between the first winding machine and the yarn receiving station, whether the AGV is able to serve the first winding machine.

In some embodiments, the scheduling module 420 is configured to:

determine, in the case where the target doffing vehicle is the AGV, a travel route of the AGV based on a position of the first winding machine; and schedule, based on the travel route of the AGV, the AGV to deliver the yarn spindle product from the first winding machine to the yarn receiving station.

In some embodiments, the scheduling module 420 is configured to:

schedule, in the case where the target doffing vehicle includes the overhead rail doffing vehicle, the overhead rail doffing vehicle to deliver the yarn spindle product from the first winding machine to the yarn receiving station via a rail based on the position of the first winding machine.

Descriptions of the specific functions and examples of each module and submodule of the apparatus according to the embodiment of the present disclosure may refer to related descriptions of corresponding steps of the above method embodiments, and will not be repeated here.

Figure 6:
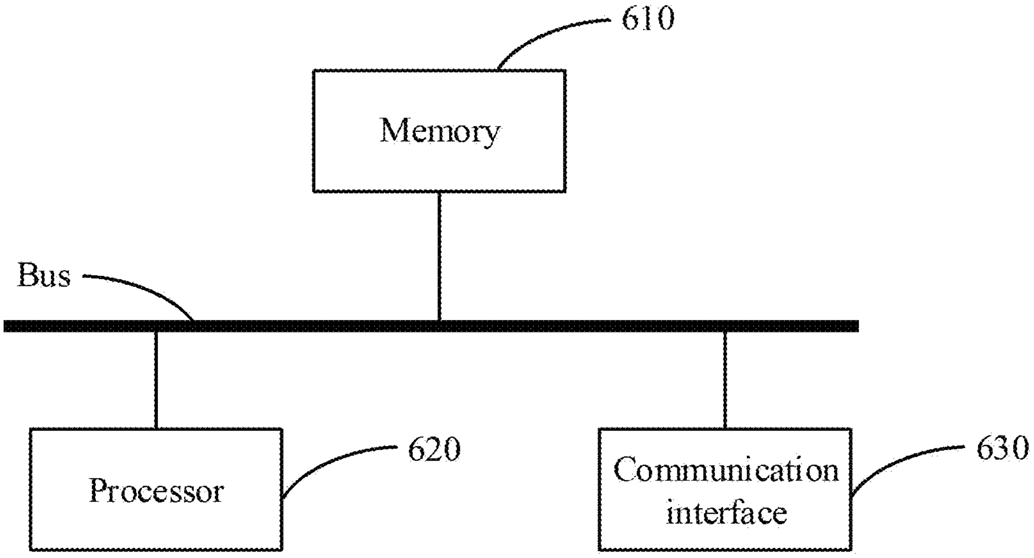
FIG. 6 is a block diagram of an electronic device used to implement a doffing scheduling method for yarn spindle product according to an embodiment of the present disclosure.

FIG. 6 is a block diagram of an electronic device for implementing an embodiment of the present disclosure. As shown in FIG. 6, the electronic device includes a memory 610 and a processor 620, the memory 610 stores a computer program is capable of being run on the processor 620. Each of a number of memory 610 and a number of processor 620 may be one or more. The memory 610 may store one or more computer programs that, when executed by the electronic device, cause the electronic device to execute the method provided in the above method embodiments. The electronic device may also include a communication interface 630 for communicating with an external device for data exchange and transmission.

If the memory 610, the processor 620, and the communication interface 630 are implemented independently, the memory 610, the processor 620, and the communication interface 630 may be connected to each other and communicate with each other through a bus. The bus may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and the like. For ease of representation, only one thick line is used to represent the bus in FIG. 6, but it does not mean that there is only one bus or one type of bus.

Alternatively, in terms of specific implementation, if the memory 610, the processor 620, and the communication interface 630 are integrated on a single chip, the memory 610, the processor 620, and the communication interface 630 may communicate with each other through internal interfaces.

It should be understood that the above processor may be a Central Processing Unit (CPU), or may be another general-purpose processor, a Digital Signal Processor (DSP), an Application Specific Integrated Circuit (ASIC), a Field Programmable Gate Array (FPGA) or another programmable logic device, a discrete gate or a transistor logic device, a discrete hardware component, or the like. The general-purpose processor may be a microprocessor or any conventional processor. It is worth noting that processor may be a processor that supports an Advanced RISC Machine (ARM) architecture.

Further, alternatively, the above memory may include a read-only memory and a random access memory, as well as a non-volatile random access memory. The memory may be either a volatile memory or a non-volatile memory, or may include both the volatile memory and the non-volatile memory. The non-volatile memory may include a Read-Only Memory (ROM), a Programmable Read-Only Memory (PROM), an Erasable Programmable Read-Only Memory (EPROM), an Electrically Erasable Programmable Read-Only Memory (EEPROM), or a flash memory. The volatile memory may include a Random Access Memory (RAM), which is used as an external cache. Many forms of the RAM are available through illustrative but not restrictive explanations, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDR SDRAM), an Enhanced Synchronous Dynamic Random Access Memory (ESDRAM), a Synch-link DRAM (SLDRAM) and a Direct RAMBUS RAM (DR RAM).

In the above embodiments, it may be fully or partially implemented through software, hardware, firmware, or any combination thereof. When implemented using the software, it may be fully or partially implemented in a form of a computer program product. The computer program product includes one or more computer instructions. When loading and executing the computer instructions on a computer, all or part of the processes or functions described in the embodiments of the present disclosure are generated. The computer may be a general-purpose computer, a specialized computer, a computer network, or other programmable device. The computer instructions may be stored in a computer readable storage medium or transmitted from one computer readable storage medium to another, for example, the computer instructions may be transmitted from a website, a computer, a server or a data center to another website site, computer, server, or data center through a wired (such as a coaxial cable, an optical fiber, a Digital Subscriber Line (DSL)) or wireless (such as infrared, Bluetooth, microwave, or the like) manner. The computer readable storage medium may be any available medium that the computer may access, or a data storage device such as a server or data center that includes one or more integrated available medium. The available medium may be a magnetic medium (such as a floppy disk, a hard drive, a magnetic tape), an optical medium (such as a Digital Versatile Disc (DVDs)), or a semiconductor medium (such as a Solid State Disk (SSDs)), or the like. It is worth noting that the computer readable storage medium mentioned in this disclosure may be the non-volatile storage medium, in other words, it may be a non-transient storage medium.

Those having ordinary sill in the art may understand that all or part of the steps to implement the above embodiments may be completed through hardware, or by instructing relevant hardware through programs. The programs may be stored in the computer readable storage medium, which may be a read only memory, a magnetic disk, an optical disk, or the like.

In the description of the embodiments of the present disclosure, reference terms "one embodiment", "some embodiments", "examples", "specific examples", "some examples", or the like mean that specific features, structures, materials, or characteristics described in combination with an embodiment or example are included in at least one embodiment or example of the present disclosure. Moreover, the specific features, structures, materials, or characteristics described may be combined in an appropriate manner in any one or more embodiments or examples. In addition, those having ordinary skill in the art may integrate and combine different embodiments or examples described in the specification, as well as features of different embodiments or examples, without mutual contradiction.

In the description of the embodiments of the present disclosure, "/" means or, unless otherwise specified. For example, "A/B" means A or B. "And/or" herein only an association relationship for describing associated objects, means there are three relationships. For example, "A and/or B" may means there is only A, there is both A and B, and there is only B.

In the description of the embodiments of the present disclosure, terms "first" and "second" are only used for a descriptive purpose and cannot be understood as indicating or implying relative importance or implying the quantity of the indicated technical features. Therefore, features limited to "first" and "second" may explicitly or implicitly include one or more of these features. In the description of the embodiments of the present disclosure, unless otherwise specified, the meaning of "a plurality of" refers to two or more.

The foregoing is only exemplary embodiments of the disclosure and are not intended to limit thereto. Any modification, equivalent replacement, improvement, and the like made within the spirit and principles of the disclosure shall be included within the scope of protection of the disclosure.

What is claimed is:

1. A doffing scheduling method for yarn spindle products, applied in an automatic doffing system which is in connection with an automated guided vehicle (AGV) and an overhead rail doffing vehicle, wherein the AGV is used to complete a dropping task of a yarn spindle product in at least one winding machine of a plurality of winding machines in a target workshop, the AGV is able to travel freely on ground without relying on a rail, the overhead rail doffing vehicle runs along a rail at a position of a certain height in the target workshop, and the AGV and the overhead rail doffing vehicle travel independently; wherein the method comprises:

determining, by the automatic doffing system, whether the AGV is able to serve a first winding machine in the plurality of winding machines, by at least one of a), b) or c):

a) determining, by the automatic doffing system, a number L of winding machines that the AGV is able to serve, based on a winding duration of a yarn spindle product to be processed in each winding machine in the plurality of winding machines; wherein the number L of the winding machines that the AGV is able to serve is negatively correlated with the winding duration of the yarn spindle product to be processed in each winding machine in the plurality of winding machines;

determining, by the automatic doffing system, L winding machines closest to a yarn receiving station among the plurality of winding machines, as a set of winding machines that are served by the AGV;

determining, by the automatic doffing system, that the AGV is able to serve the first winding machine, in a case where the set of winding machines that are served by the AGV includes the first winding machine; and determining, by the automatic doffing system, that the AGV is unable to serve the first winding machine, in a case where the set of winding machines that are served by the AGV excludes the first winding machine;

b) obtaining, by the automatic doffing system, a number of yarn spindle products to be doffed in a second winding machine and a number of yarn spindle products to be doffed in the first winding machine, in a case of the AGV is carrying out a doffing task in the second winding machine in the plurality of winding machines and a time distance between current time and dropping time of the first winding machine in the target workshop is less than a first preset duration;

determining, by the automatic doffing system, that the AGV is able to serve the first winding machine, in a case of a total number of the yarn spindle products to be doffed in the second winding machine and the yarn spindle products to be doffed in the first winding machine is less than or equal to a number of positions available for the AGV and the AGV is able to move from a position of the second winding machine to a position of the first winding machine within the first preset duration; and determining, by the automatic doffing system, that the AGV is unable to serve the first winding machine, in a case of the total number of the yarn spindle products to be doffed in the second winding machine and the yarn spindle products to be doffed in the first winding machine is greater than the number of positions available for the AGV or the AGV is unable to move from the position of the second winding machine to the position of the first winding machine within the first preset duration;

c) determining, by the automatic doffing system, based on a winding duration of a yarn spindle product to be processed in each winding machine in the plurality of winding machines, estimated time for each doffing in each winding machine within a target period;

determining, by the automatic doffing system, based on the estimated time for each doffing in each winding machine within the target period, a doffing time list within the target period, wherein the doffing time list includes multiple doffing times and the winding machine corresponding to each of the multiple doffing times;

determining, by the automatic doffing system, based on the doffing time list, 2 winding machines with a doffing time interval less than a second preset duration;

determining, by the automatic doffing system, that the AGV is able to serve the first winding machine, in a case of a distance between the first winding machine among the 2 winding machines and the yarn receiving station is less than a set distance threshold; and determining, by the automatic doffing system, that the AGV is unable to serve the first winding machine, in a case of the distance between the first winding machine among the 2 winding machines and the yarn receiving station is not less than the set distance threshold;

determining, by the automatic doffing system, a target doffing vehicle corresponding to the first winding machine, by:

determining, by the automatic doffing system, the AGV as the target doffing vehicle, in a case where the AGV is able to serve the first winding machine; and determining, by the automatic doffing system, the overhead rail doffing vehicle as the target doffing vehicle, in a case where the AGV is not able to serve the first winding machine; and scheduling, by the automatic doffing system, the target doffing vehicle to complete a doffing task of a yarn spindle product in the first winding machine.

2. The method of claim 1, wherein the scheduling of the target doffing vehicle to complete the doffing task of the yarn spindle product in the first winding machine comprises:

determining, by the automatic doffing system, in the case where the target doffing vehicle is the AGV, a travel route of the AGV based on a position of the first winding machine; and scheduling, by the automatic doffing system, based on the travel route of the AGV, the AGV to deliver the yarn spindle product from the first winding machine to the yarn receiving station.

3. The method of claim 1, wherein the scheduling of the target doffing vehicle to complete the doffing task of the yarn spindle product in the first winding machine comprises:

scheduling, by the automatic doffing system, in the case where the target doffing vehicle includes the overhead rail doffing vehicle, the overhead rail doffing vehicle to deliver the yarn spindle product from the first winding machine to the yarn receiving station via a rail based on a position of the first winding machine.

4. An electronic device, applied in an automatic doffing system which is in connection with an automated guided vehicle (AGV) and an overhead rail doffing vehicle, wherein the AGV is used to complete a dropping task of a yarn spindle product in at least one winding machine of a plurality of winding machines in a target workshop, the AGV is able to travel freely on ground without relying on a rail, the overhead rail doffing vehicle runs along a rail at a position of a certain height in the target workshop, and the AGV and the overhead rail doffing vehicle travel independently;

wherein the electronic device comprises:

at least one processor; and a memory connected in communication with the at least one processor;

wherein the memory stores an instruction executable by the at least one processor, and the instruction, when executed by the at least one processor, enables the at least one processor to execute:

determining whether the AGV is able to serve a first winding machine in the plurality of winding machines, by at least one of a), b) or c);

a) determining a number L of winding machines that the AGV is able to serve, based on a winding duration of a yarn spindle product to be processed in each winding machine in the plurality of winding machines; wherein the number L of the winding machines that the AGV is able to serve is negatively correlated with the winding duration of the yarn spindle product to be processed in each winding machine in the plurality of winding machines;

determining L winding machines closest to a yarn receiving station among the plurality of winding machines, as a set of winding machines that are served by the AGV;

determining that the AGV is able to serve the first winding machine, in a case where the set of winding machines that are served by the AGV includes the first winding machine; and determining that the AGV is unable to serve the first winding machine, in a case where the set of winding machines that are served by the AGV excludes the first winding machine;

b) obtaining a number of yarn spindle products to be doffed in a second winding machine and a number of yarn spindle products to be doffed in the first winding machine, in a case of the AGV is carrying out a doffing task in the second winding machine in the plurality of winding machines and a time distance between current time and dropping time of the first winding machine in the target workshop is less than a first preset duration;

determining that the AGV is able to serve the first winding machine, in a case of a total number of the yarn spindle products to be doffed in the second winding machine and the yarn spindle products to be doffed in the first winding machine is less than or equal to a number of positions available for the AGV and the AGV is able to move from a position of the second winding machine to a position of the first winding machine within the first preset duration; and determining that the AGV is unable to serve the first winding machine, in a case of the total number of the yarn spindle products to be doffed in the second winding machine and the yarn spindle products to be doffed in the first winding machine is greater than the number of positions available for the AGV or the AGV is unable to move from the position of the second winding machine to the position of the first winding machine within the first preset duration;

c) determining, based on a winding duration of a yarn spindle product to be processed in each winding machine in the plurality of winding machines, estimated time for each doffing in each winding machine within a target period;

determining, based on the estimated time for each doffing in each winding machine within the target period, a doffing time list within the target period, wherein the doffing time list includes multiple doffing times and the winding machine corresponding to each of the multiple doffing times;

determining, based on the doffing time list, 2 winding machines with a doffing time interval less than a second preset duration;

determining that the AGV is able to serve the first winding machine, in a case of a distance between the first winding machine among the 2 winding machines and the yarn receiving station is less than a set distance threshold; and determining that the AGV is unable to serve the first winding machine, in a case of the distance between the first winding machine among the 2 winding machines and the yarn receiving station is not less than the set distance threshold;

determining a target doffing vehicle corresponding to the first winding machine, by:

determining the AGV as the target doffing vehicle, in a case where the AGV is able to serve the first winding machine; and determining the overhead rail doffing vehicle as the target doffing vehicle, in a case where the AGV is not able to serve the first winding machine; and scheduling the target doffing vehicle to complete a doffing task of a yarn spindle product in the first winding machine.

5. A non-transitory computer-readable storage medium, applied in an automatic doffing system which is in connection with an automated guided vehicle (AGV) and an overhead rail doffing vehicle, wherein the AGV is used to complete a dropping task of a yarn spindle product in at least one winding machine of a plurality of winding machines in a target workshop, the AGV is able to travel freely on ground without relying on a rail, the overhead rail doffing vehicle runs along a rail at a position of a certain height in the target workshop, and the AGV and the overhead rail doffing vehicle travel independently;

wherein the non-transitory computer-readable storage medium stores a computer instruction thereon, and the computer instruction is used to cause the automatic doffing system to execute:

determining whether the AGV is able to serve a first winding machine in the plurality of winding machines, by at least one of a), b) or c);

a) determining a number L of winding machines that the AGV is able to serve, based on a winding duration of a yarn spindle product to be processed in each winding machine in the plurality of winding machines; wherein the number L of the winding machines that the AGV is able to serve is negatively correlated with the winding duration of the yarn spindle product to be processed in each winding machine in the plurality of winding machines;

determining L winding machines closest to a yarn receiving station among the plurality of winding machines, as a set of winding machines that are served by the AGV;

determining that the AGV is able to serve the first winding machine, in a case where the set of winding machines that are served by the AGV includes the first winding machine; and determining that the AGV is unable to serve the first winding machine, in a case where the set of winding machines that are served by the AGV excludes the first winding machine;

b) obtaining a number of yarn spindle products to be doffed in a second winding machine and a number of yarn spindle products to be doffed in the first winding machine, in a case of the AGV is carrying out a doffing task in the second winding machine in the plurality of winding machines and a time distance between current time and dropping time of the first winding machine in the target workshop is less than a first preset duration;

determining that the AGV is able to serve the first winding machine, in a case of a total number of the yarn spindle products to be doffed in the second winding machine and the yarn spindle products to be doffed in the first winding machine is less than or equal to a number of positions available for the AGV and the AGV is able to move from a position of the second winding machine to a position of the first winding machine within the first preset duration; and determining that the AGV is unable to serve the first winding machine, in a case of the total number of the yarn spindle products to be doffed in the second winding machine and the yarn spindle products to be doffed in the first winding machine is greater than the number of positions available for the AGV or the AGV is unable to move from the position of the second winding machine to the position of the first winding machine within the first preset duration;

c) determining, based on a winding duration of a yarn spindle product to be processed in each winding machine in the plurality of winding machines, estimated time for each doffing in each winding machine within a target period;

determining, based on the estimated time for each doffing in each winding machine within the target period, a doffing time list within the target period, wherein the doffing time list includes multiple doffing times and the winding machine corresponding to each of the multiple doffing times;

determining, based on the doffing time list, 2 winding machines with a doffing time interval less than a second preset duration;

determining that the AGV is able to serve the first winding machine, in a case of a distance between the first winding machine among the 2 winding machines and the yarn receiving station is less than a set distance threshold; and determining that the AGV is unable to serve the first winding machine, in a case of the distance between the first winding machine among the 2 winding machines and the yarn receiving station is not less than the set distance threshold;

determining a target doffing vehicle corresponding to the first winding machine, by:

determining the AGV as the target doffing vehicle, in a case where the AGV is able to serve the first winding machine; and determining the overhead rail doffing vehicle as the target doffing vehicle, in a case where the AGV is not able to serve the first winding machine; and scheduling the target doffing vehicle to complete a doffing task of a yarn spindle product in the first winding machine.

* * * * *